United States Patent [19]
Wolff et al.

[11] Patent Number: 6,046,811
[45] Date of Patent: Apr. 4, 2000

[54] METHOD AND APPARATUS FOR DETERMINING ELECTRICAL CONDUCTIVITY OF A SURFACE OF AN OBJECT

[75] Inventors: Lawrence B. Wolff, New York, N.Y.; Hua Chen, Baltimore, Md.

[73] Assignee: The Johns Hopkins University, Baltimore, Md.

[21] Appl. No.: 08/583,865

[22] Filed: Jan. 11, 1996

[51] Int. Cl.$^7$ ...................................................... G01J 4/00
[52] U.S. Cl. .......................... 356/369; 356/366; 356/368; 356/72
[58] Field of Search .................................. 356/364, 369, 356/366–368, 72; 324/96

[56] References Cited

U.S. PATENT DOCUMENTS

| | | | |
|---|---|---|---|
| 3,445,833 | 5/1969 | Lins ........................................... | 356/368 |
| 3,744,920 | 7/1973 | Adams et al. ............................ | 356/237 |
| 4,306,809 | 12/1981 | Azzam ....................................... | 356/368 |
| 4,523,848 | 6/1985 | Gorman et al. ........................... | 356/368 |
| 4,983,911 | 1/1991 | Henley ....................................... | 356/364 |
| 5,028,138 | 7/1991 | Wolff ......................................... | 356/364 |
| 5,247,244 | 9/1993 | Miller et al. ................................ | 324/96 |
| 5,434,698 | 7/1995 | Takano et al. ............................ | 356/364 |
| 5,550,370 | 8/1996 | Takano et al. ............................ | 356/364 |
| 5,557,324 | 9/1996 | Wolff ......................................... | 345/207 |

OTHER PUBLICATIONS

Shafer, S., "Using color to Separate Reflection Components," *Color Research and Application*, vol. 10, No. 4, pp. 210–218, 1985.

Klinker, G., et al., "Using a Color Reflection Model to Separate Highlights From Object Color," *Proceedings of the IEEE First International Conference on Computer Vision-(ICCV)*, pp. 145–150, Jun. 1987.

Wolff, L.B., et al., "Polarization–Based Material Classification From Specular Reflection," *IEEE Transactions on Pattern Analysis and Machine Intelligence (PAMI)*, vol. 12(11), pp. 1059–1071, Nov. 1990.

Healey, G., et al., "Predicting Material Classes," *Proceedings of the DARPA Image Understanding Workshop*, pp. 1140–1146, Apr. 1988.

Wolff, L.B. et al., "Polarization Camera Sensors," *Image and Vision Computing*, vol. 13, No. 6, pp. 497–510, Aug. 1995.

Healey, G., "Using Color for Geometry–Insensitive Segmentation," *Journal of the Optical Society of America A*, vol. 6(6), pp. 920–937, Jun. 1989.

Chen, H., et al., "Polarization Phase–Based Method For Material Classification And Object Recognition In Computer Vision," *IEEE*, pp. 128–135, 1996.

(List continued on next page.)

*Primary Examiner*—Robert H. Kim
*Attorney, Agent, or Firm*—Kirk D. Houser; Arnold B. Silverman; Eckert Seamans Cherin & Mellott, LLC

[57] ABSTRACT

An apparatus for determining electrical conductivity of a surface of an object. The apparatus comprises a first polarizer for polarizing light incident upon the surface of the object. The apparatus also comprises a camera mechanism for receiving the polarized light reflected from the surface of the object and identifying the electrical conductivity of the surface of the object from phase retardance of polarization of the polarized light upon reflection from the surface of the object. The present invention pertains to a method for determining electrical conductivity of a surface of an object. The method comprises the steps of polarizing light. Next there is the step of reflecting the polarized light off the surface of the object. Then there is the step of receiving the reflected polarized light at a camera mechanism. Next there is the step of converting the received polarized light into a corresponding electrical signal with the camera mechanism. Next, there is the step of determining phase retardance of polarization due to the reflection of the polarized light off of the surface of the object. Then, there is the step of identifying the electrical conductivity of the surface of the object from the phase retardance of the polarization of the polarized light reflected off of the surface of the object.

26 Claims, 7 Drawing Sheets

OTHER PUBLICATIONS

Wolff, L.B., et al., "Liquid Crystal Polarization Camera," *Proceeds of the IEEE Workshop on Applications of Computer Vision*, pp. 120–127, Dec. 1992.

Wolff, L.B., et al., "Constraining Object Features Using a Polarization Reflectance Model, " *IEEE Transactions on Pattern Analysis and Machine Intelligence*, vol. 13, No. 7, pp. 635–657, Jul. 1991.

Horn, B.K.P., "Obtaining Shape From Shading Information," *The Psychology of Computer Vision*, pp. 115–155, 1975.

Koshikawa, K., "A Polarimetric Approach to Shape Understanding of Glossy Objects, " *Advances in Robotics*, vol. 2(2), pp. 190–192, 1987.

SUPERIMPOSED UNPOLARIZED AND
ELLIPTICALLY POLARIZED STATES

LINEAR POLARIZER

METHOD AND APPARATUS FOR DETERMINING ELECTRICAL CONDUCTIVITY OF A SURFACE OF AN OBJECT

FIELD OF THE INVENTION

The present invention is related to the identification of the electrical conductivity of a surface of an object. More specifically, the present invention is related to the identification of the electrical conductivity of a surface of an object from phase retardance of polarization of polarized light upon reflection from the surface of the object.

BACKGROUND OF THE INVENTION

Material classification is an important task in computer vision, as it provides important information for scene understanding. The segmentation of object surfaces according to their intrinsic composition has much potential for both lower-level inspection processes and higher-level object recognition. In particular, electrically conducting materials such as metal, and, dielectric (non-conducting) are two broad material classes with properties relevant to a number of applications. For example, a circuit board inspection problem requires the determination and verification of the placement of metal and insulator parts. In addition, the determination of material type can augment the geometrical shape description of objects to include intrinsic physical characteristics as well.

Some previous work (Glenn Healey and W. E. Blanz. Personal Communication.) on discriminating between dielectric/metal material types has consisted of training a group of known samples with respect to a set of features, an approach commonly used in conventional pattern recognition techniques. Such methods however have no definitive physical connection between discrimination and the intrinsic composition of the material. There has been some speculation about whether a definitive relationship exists between a set of features for the reflected color distribution and the intrinsic composition of the surface (G. Healey and T. O. Binford. Predicting material classes. In *Proceedings of the DARPA Image Understanding Workshop,* pages 1140–1146, Cambridge, Mass., April 1988); (G. Healey and W. E. Blanz. Identifying metal surfaces in color images. In *SPIE Proceedings of Optics, Electro-Optics, and Sensors,* Orlando, Fla., April 1988). In (G. Healey. Using color for geometry-insensitive segmentation. *Journal of the Optical Society of America A,* 6(6):920–937, June 1989), Healey proposes a method for distinguishing metals and inhomogeneous dielectric surfaces using the dichromatic reflectance model (S. Shafer. Using color to separate reflection components. *Color Research and Application,* 10:210–218, 1985); (G. Klinker, S. Shafer and T. Kanade. Using a color reflection model to separate highlights from object color. In *Proceedings of the IEEE First International Conference on Computer Vision (ICCV),* pages 145–150, London, England, June 1987).

A polarization-based method (L. B. Wolff. Polarization-based material classification from specular reflection. *IEEE Transactions on Pattern Analysis and Machine Intelligence (PAMI),* 12(11):1059–1071, November 1990) was introduced for discriminating between dielectric and metal surfaces based upon Fresnel reflection theory. According to this theory, incident unpolarized light becomes strongly partially polarized upon specular reflection from dielectric surfaces over a large range of specular incident angles, while for metal surfaces such reflection is not as nearly partially polarized. Assuming that the specular component of reflection is significantly higher than the diffuse component, the ratio of the maximum to the minimum transmitted radiance sensed at a pixel, with respect to the rotation of a polarizer, can be used to estimate the polarization Fresnel ratio, a quantity that differentiates materials with respect to electrical conductivity. Segmentation of dielectric and metal can be achieved by thresholding this ratio of maximum to minimum transmitted radiance measured at each pixel, the threshold values being directly connected to physical material characteristics. This has been successfully implemented for circuit board inspection, identification of rust on metal, and identification of metal and dielectric parts of a number of objects.

A disadvantage of this polarization-based method is that it becomes inaccurate when the diffuse component of reflection is not small compared with the specular component. For instance, this method will misclassify highly diffuse white paper as metal. This disadvantage also sometimes constrains the use of an extended light source to cover more object points, since the diffuse component is boosted at the same time. Another limitation is that the specular incidence angle $\psi$ must be restricted to a certain range $30°<\psi<80°$ for insured accuracy. Because this previous polarization-based method assumes incident unpolarized light, detection of metallic objects illuminated by the partially linear polarized light from clear or partly cloudy sky (e.g., for automatic target detection and recognition) has also been a problem.

The material classification method presented here, based upon the polarization phase of a light wave, is shown to have significantly distinct advantages in that this method functions quite well under almost all conditions which have been previously problematic to existing material classification techniques. The phenomenon of polarization phase is seen in varying states of elliptical polarization where the shape and orientation of the ellipse is determined by the relative phase difference between orthogonal light wave components (e.g., circular polarization results from orthogonal light waves being ¼ wavelength relatively phase shifted). Polarization phase has been used before to aid in the determination of surface orientation for dielectric objects (K. Koshikawa and Y. Shirai. A model-based recognition of glossy objects using their polarimetric properties. *Advances in Robotics,* 2(2), 1987). The distinction between metal and dielectric with respect to phase of polarization is that metal retards light waves and therefore alters the phase of polarization of incident light upon specular reflection whereas dielectrics do not at all alter the phase of polarization of incident light. For instance, linearly polarized incident light will become elliptically polarized when reflected from a metal, but remain linearly polarized when reflected from a dielectric. The distinction between metal and dielectric material is therefore determined by whether there is a measurable retardance between the polarization phase of incident and reflected light with respect to an object. One way of measuring phase retardance is by measuring all four Stokes parameters of polarization such as what is accomplished in precise measurements for astronomy observations or by a measurement apparatus used in (K. Koshikawa and Y. Shirai. A model-based recognition of glossy objects using their polarimetric properties. *Advances in Robotics,* 2(2), 1987). Such an approach is usually unacceptable in a number of machine vision applications where either real-time response is required or the scene can move or change rapidly. An advance is presented whereby a much simpler methodology for measuring retardance without having to measure all four Stokes parameters is presented that is extremely sensitive to small shifts in phase. Furthermore, this methodology can be performed utilizing a modification to existing polarization sensing cameras (L. B. Wolff and T. A. Mancini. Liquid crystal polarization camera. In *Proceedings of the IEEE Workshop on Applications of Computer Vision*, pages 120–127, Palm Springs, Calif., December 1992) making it possible to implement this technique at near real-time rates.

The presented polarization phase based technique is applicable to scenes where incident illumination contains any non-zero magnitude component of linear polarization at any orientation except parallel or perpendicular to the plane of incidence. These illumination conditions are complementary to the existing polarization-based technique (L. B. Wolff. Polarization-based material classification from specular reflection. *IEEE Transactions on Pattern Analysis and Machine Intelligence (PAMI)*, 12(11):1059–1071, November 1990) where incident illumination is unpolarized. A key advantage of this polarization phase-based technique is that it can be utilized to determine metal/dielectric objects illuminated outdoors by a clear or partly cloudy sky, as skylight is partially linear polarized according to Rayleigh's Law (M. Born and E. Wolf. *Principles of Optics*. Pergamon Press, 1959). Combined with the existing polarization-based method which can detect metal/dielectric objects under cloudy (unpolarized) skies these methods can provide important information for automatic target detection and recognition algorithms under almost any sky condition. Another key advantage of the presented polarization-based technique is that even if specular reflection from a conductive surface is accompanied by a much larger diffuse reflection component, the measurement of retardance is limited only by the signal-to-noise ratio of the camera sensor being larger than the ratio of diffuse to specular reflection. This technique is so sensitive to the retardance of the linear polarized component, that phase shifting can be detected for most metals close to normal incidence, and close to grazing. In the laboratory where lighting is easily controlled, material classification is seen to perform very accurately using this technique.

SUMMARY OF THE INVENTION

An apparatus for determining electrical conductivity of a surface of an object. The apparatus comprises a first polarizer for polarizing light incident upon the surface of the object. The apparatus also comprises a camera mechanism for receiving the polarized light reflected from the surface of the object and identifying the electrical conductivity of the surface of the object from phase retardance of polarization of the polarized light upon reflection from the surface of the object.

The present invention pertains to a method for determining electrical conductivity of a surface of an object. The method comprises the steps of polarizing light. Next there is the step of reflecting the polarized light off the surface of the object. Then there is the step of receiving the reflected polarized light at a camera mechanism. Next there is the step of converting the received polarized light into a corresponding electrical signal with the camera mechanism. Next, there is the step of determining phase retardance of polarization due to the reflection of the polarized light off of the surface of the object. Then, there is the step of identifying the electrical conductivity of the surface of the object from the phase retardance of the polarization of the polarized light reflected off of the surface of the object.

BRIEF DESCRIPTION OF THE DRAWINGS

In the accompanying drawings, the preferred embodiment of the invention and preferred methods of practicing the invention are illustrated in which.

DESCRIPTION OF THE PREFERRED EMBODIMENT

Figure 6:
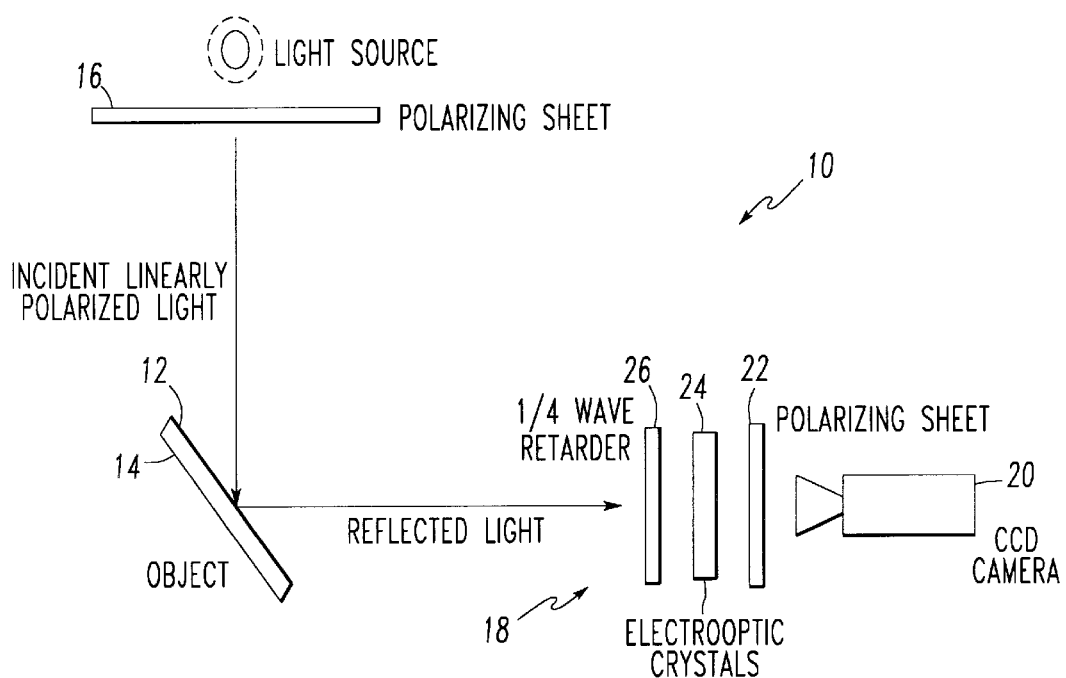
FIG. 6 is a schematic representation of a preferred embodiment of the present invention for measuring phase retardance.

Referring now to the drawings wherein like reference numerals refer to similar or identical parts throughout the several views, and more specifically to FIG. 6 thereof, there is shown an apparatus 10 for determining electrical conductivity of a surface 12 of an object 14. The apparatus 10 comprises a first polarizer 16 for polarizing light incident upon the surface 12 of the object 14. The apparatus 10 also comprises a camera mechanism 18 for receiving the polarized light reflected from the surface 12 of the object 14 and identifying the electrical conductivity of the surface 12 of the object 14 from phase retardance of polarization of the polarized light upon reflection from the surface 12 of the object 14.

The camera mechanism 18 preferably includes a CCD camera 20 which receives the polarized light reflected from the surface 12 of the object 14 and identifies the electrical conductivity of the surface 12 of the object 14 from phase retardance of polarization of the polarized light upon reflection from the surface 12 of the object 14. The camera mechanism 18 preferably also includes a second polarizer 22 disposed adjacent the CCD camera through which the polarized light reflected from the surface 12 of the object 14 passes before it is received by the CCD camera 20.

Additionally, the camera mechanism 18 preferably also includes at least one electro-optic crystal 24 disposed adjacent to the second polarizer through which the polarized light reflected from the surface 12 of the object 14 passes before it passes through the second polarizer. Moreover, the camera mechanism 18 includes a retarder 26 disposed adjacent the at least one electro-optic crystal 24 through which the polarized light reflected from the surface 12 of the object 14 passes before it passes through the at least one electro-optic crystal 24. The retarder 26 is preferably a ¼ wave retarder.

The present invention pertains to a method for determining electrical conductivity of a surface 12 of an object 14. The method comprises the steps of polarizing light. Next, there is the step of reflecting the polarized light off the surface 12 of the object 14. Then, there is the step of receiving the reflected polarized light at a camera mechanism 18. Next, there is the step of converting the received polarized light into a corresponding electrical signal with the camera mechanism 18. Next, there is the step of determining phase retardance of polarization due to the reflection of the polarized light off of the surface 12 of the object 14. Then, there is the step of identifying the electrical conductivity of the surface 12 of the object 14 from the phase retardance of the polarization of the polarized light reflected off of the surface 12 of the object 14.

In regard to the operation of the invention, it is not a surprise that the polarization of light was rediscovered only lately in computational vision, since we as human beings are completely oblivious to it. Since Horn (B. K. P. Horn. Obtaining shape from shading information. *The Psychology of Computer Vision,* pages 115–155, 1975) introduced optical models of reflection and imaging to physics-based computer vision, most research work in vision only focused on the information contained in the reflected intensity or shading. The first paper in computer vision to use polarization information was by Koshikawa (K. Koshikawa and Y. Shirai. A model-based recognition of glossy objects using their polarimetric properties. *Advances in Robotics,* 2(2), 1987) where a polarimetric method was implemented to find surface normals. As human beings we see in terms of the perception of intensity and color. Since intensity is only the simple summation of polarization components, it is a reduced information set from the more complete polarization state. Therefore polarization-based vision is a more general approach than intensity vision.

Figure 1:
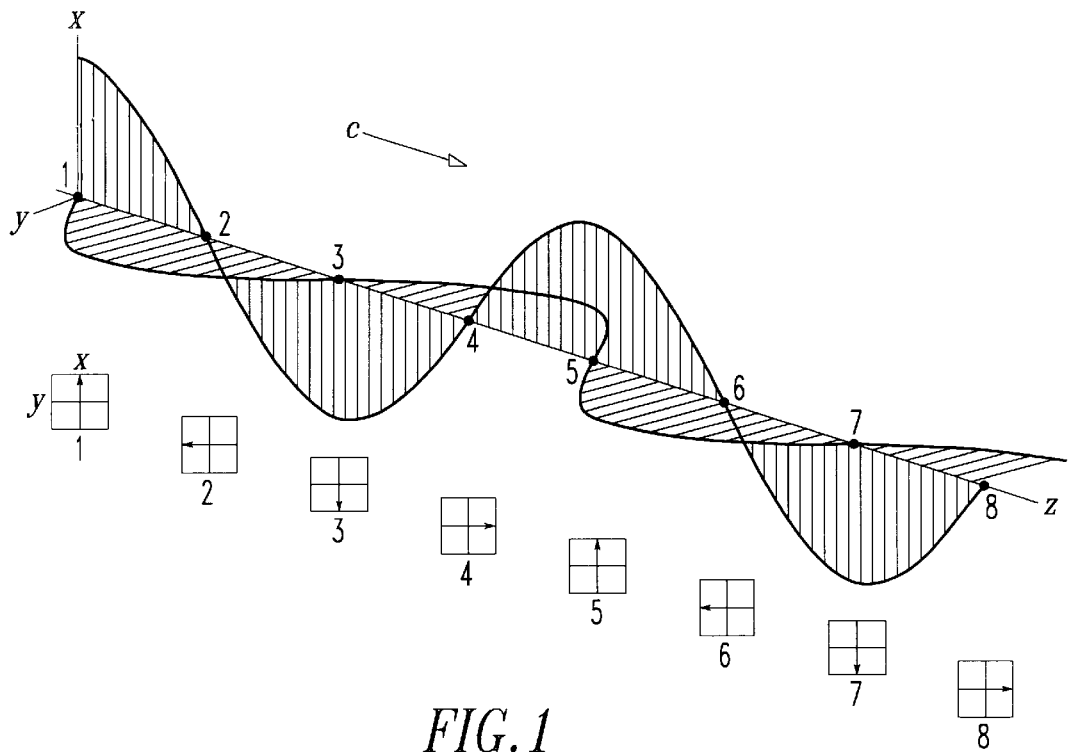
FIG. 1 is a representation of two mutually orthogonal harmonics ¼ wavelength relative phase tracing out circularly polarized light.

The polarization of light is a complete description of its properties as a transverse electromagnetic wave in space and time, apart from wavelength. Electromagnetic theory represents light in free space as transverse vibrations of electric and magnetic fields E and H which are mutually perpendicular and in phase. It is sufficient to consider one of them, say E, since the electrical and magnetic vibrations are related to each other. Such a field (choose E) can be understood in terms of the superposition of two orthogonal harmonic vibrations in a plane perpendicular to the direction of propagation (M. Born and E. Wolf. *Principles of Optics.* Pergamon Press, 1959). In general any polarization state can be represented as the superposition of an unpolarized state with a completely polarized state. The unpolarized state consists of two orthogonal harmonic vibrations superimposed incoherently producing an isotopically random E-field in the plane perpendicular to the direction of light propagation. Completely polarized light is the coherent superposition of two orthogonal harmonic vibrations which in general makes the resulting tip of the E-field deterministically trace out an ellipse whose shape and orientation of the major/minor axes are dependent upon the relative magnitude and phase difference of the two orthogonal harmonic components. FIG. 1 shows an example of two equal magnitude orthogonal harmonics that are ¼ wavelength (i.e., π/2) phase shifted with respect to each other, making the tip of the E-field in this case trace out a circle in the plane perpendicular to the direction of propagation (i.e., circularly polarized light). The handedness of circular polarization, whether the circle traces clockwise or counterclockwise, depends whether the phase difference is π/2 or 3π/2. Linear polarized light occurs when the shape of the ellipse degenerates into a line such as for a phase difference of either 0 or π.

Figure 2:
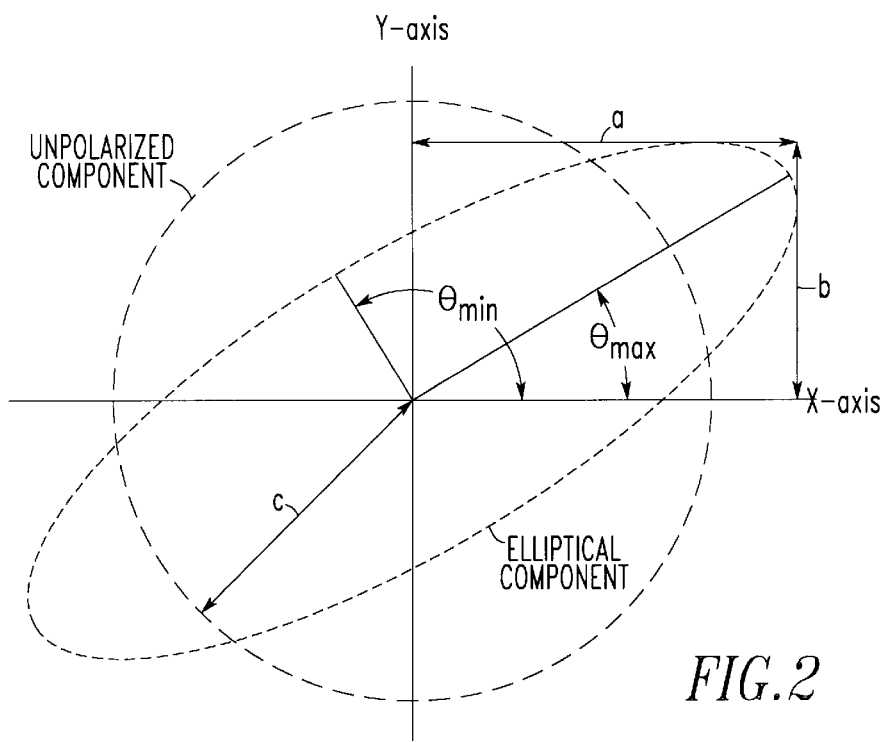
FIG. 2 is a representation of superimposed unpolarized and elliptically polarized components.

FIG. 2 shows the superposition of the E-field distributions associated with unpolarized light, and, elliptically polarized light, in the plane perpendicular to the direction of light propagation (i.e., light propagates out of the paper). The "dashed" circle in FIG. 2 represents the isotopically random E-field distribution of unpolarized light. The "dotted" ellipse represents the E-field tracing of the elliptically polarized component. While unpolarized and circularly polarized light may appear geometrically similar in such a diagram it is important to realize that they are very different phenomena having significantly different properties (M. Born and E. Wolf. *Principles of Optics.* Pergamon Press, 1959).

Quantitatively the total electric field distribution E in FIG. 2 can be represented by:

$$\vec{E} = a \cos(\phi)\cdot\hat{x} + b\cos(\phi+\delta)\cdot\hat{y} + \vec{E}_{un} \qquad (1)$$

where a and b denote the magnitudes of two mutually orthogonal harmonics making up the elliptically polarized component, $\phi = kz - \omega t$ is the dependency on time, and, z perpendicular to the page, and $\delta$ is the phase difference between the harmonics. $E_{un}$ represents the unpolarized component. The major and minor axes of the elliptical component of polarization respectively occur at orientations $\theta_{max}$ and $\theta_{min}$ relative to the x-axis in FIG. 2. The radius c of the circle representing unpolarized light is equal to $\sqrt{I_{un}}$, where $I_{un}$ is the intensity for the unpolarized component. When $I_{un} = 0$, the light becomes completely polarized.

For the "dotted" ellipse in FIG. 2 there are two special cases: 1) if a=b and $\delta = \frac{1}{2}\cdot n\pi$, n=±1, ±3, . . . , the ellipse becomes a circle and this part of the light is called a right-handed or left-handed circularly polarized light depending the sign of phase difference δ;2) if δ=nπ, n=0, ±1, ±2, . . . , the ellipse degenerates to a straight line, and the light is linearly polarized. We immediately realize that the phase difference $\delta$ plays a key role in determining the shape and orientation of the polarization ellipse.

To observe polarization information in a simple physical measurement, a linear polarizer is placed at angle θ with respect to the x-axis (where θ=0° is the reference direction) along the unit vector $$\hat{P} = \cos\theta\cdot\hat{x} + \sin\theta\cdot\hat{y} \qquad (2)$$

to observe the time-averaged intensity of the incoming light described by equation (1). According to Malus' law, a radiance is received of $$\begin{aligned} I(\theta) &= \langle |\vec{E}\cdot\hat{P}|^2 \rangle \text{ (time-averaging)} \\ &= \langle a^2\cos^2\theta\cos^2\omega t + b^2\sin^2\theta\cos^2(\omega t + \delta) + \\ &\quad 2ab\cos\theta\sin\theta\cos\omega t\cos(\omega t + \delta)\rangle \frac{+1}{2}I_{un} \end{aligned} \qquad (3)$$

where we used $<\cos^2\omega t> = <\cos^2(\omega t + \delta)> = \frac{1}{2}$ and $<\cos\omega t\sin\omega t> = 0$.

Expression (3) can be represented in terms of a single sinusoid as:

$$I(\theta) = \frac{1}{2}\left[I_{un} + \frac{1}{2}(a^2 + b^2) + I_s\cos 2(\theta - \theta_{max})\right] \qquad (4)$$

with modulated magnitude $I_s$ and maximum occurring at $\theta_{max}$, where $$I_s = \sqrt{\frac{1}{4}(a^2+b^2)^2 - a^2b^2\sin^2\delta} \qquad (5)$$

$$\theta_{max} = \frac{1}{2}\tan^{-1}(2ab\cos\delta/(a^2-b^2)) \qquad (6)$$

Figure 3A:
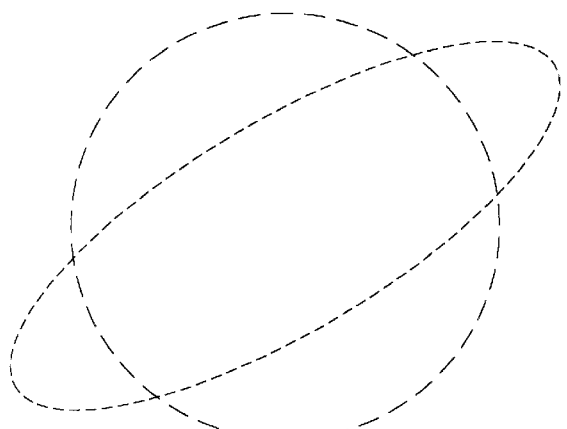
FIGS. 3a–3c are representations in regard to transmitting the superposition of elliptically and unpolarized components through a linear polarizer.
Figure 3C:
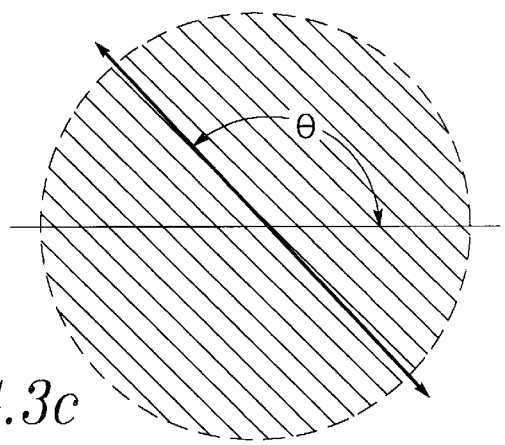
Figure 3B:
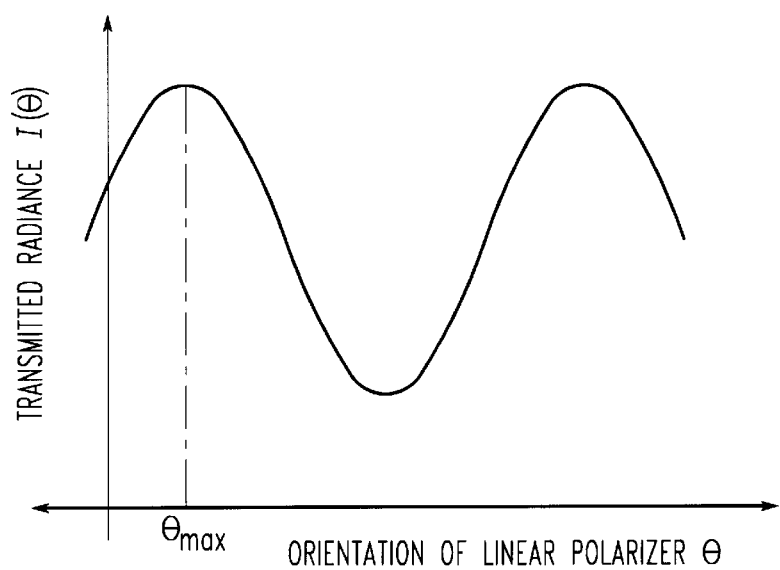

The sinusoidal nature of the transmitted radiance through a Polaroid is shown in FIG. 3. If the phase $\delta$ is known beforehand, this sinusoid uniquely determines the state of polarization (i.e., the total intensity, the relative intensity of the unpolarized and elliptically polarized states, and the orientation of the major axis of the elliptically polarized state). Partially linear polarized light has $\delta=0$ so that such a state of polarization can be uniquely determined from this sinusoid (L. B. Wolff. Polarization-based material classification from specular reflection. *IEEE Transactions on Pattern Analysis and Machine Intelligence (PAMI)*, 12(11):1059–1071, November 1990). If $\delta$ is not known, and therefore has to be measured, this sinusoid produced from a rotating linear polarizer is not sufficient for measuring a state of polarization. A phase retarding optical element is required to be placed in series with a linear polarizer to measure all four independent parameters describing partial elliptical polarization (M. Born and E. Wolf. *Principles of Optics*. Pergamon Press, 1959).

From Eq. (6), $$\tan 2\theta_{max} = \cos\delta \frac{2b/a}{1-(b/a)^2} \qquad (7)$$
$$= \cos\delta \cdot \tan 2\alpha$$

where $\tan\alpha = b/a$. The angle $\alpha$ is the orientation resulting from the superposition of the maximum of the $\hat{x}$ and the $\hat{y}$ harmonics, a and b respectively. If $\delta=0$, as for partially linearly polarized light, clearly $\theta_{max}=\alpha$. A non-zero phase difference $\delta$ modifies where at $\theta_{max}$ the maximum occurs for the transmitted radiance sinusoid. It is the basic observation that non-zero phase differences $\delta$ influences $\theta_{max}$ that motivates the implementation for detecting non-zero phase differences. In order to have a practical algorithm that can do this, important additional features need to be added as described below.

Figure 4:
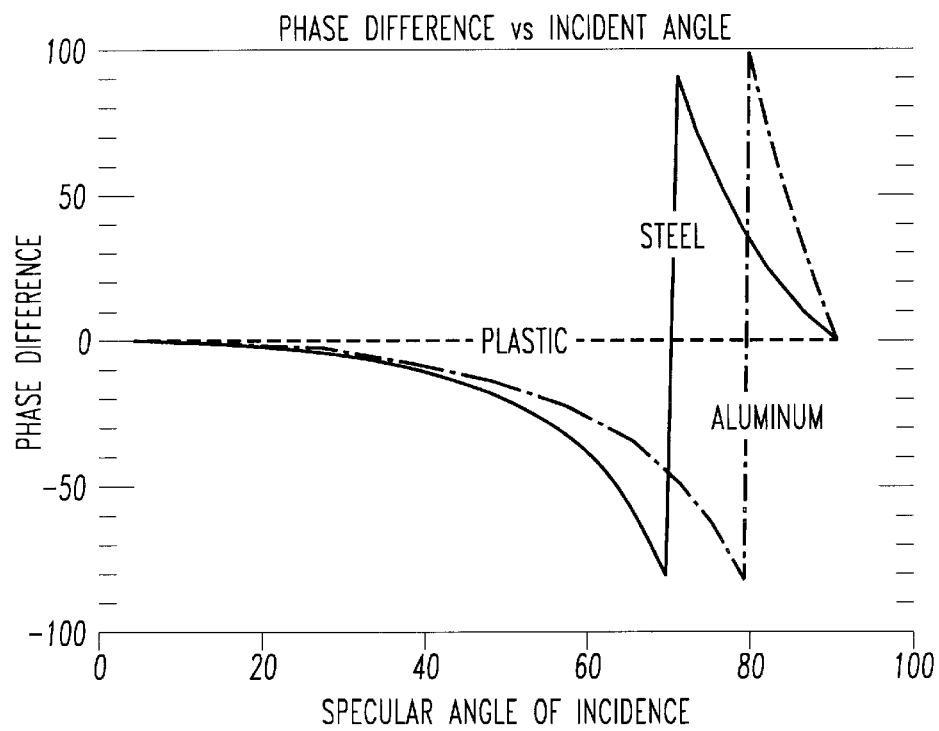
FIG. 4 is a graph of phase retardance vs. angle of incidence for specular reflection from various materials.

The basic premise here for the distinction between conducting and non-conducting materials is that incident linear polarization will be relatively phase shifted to an elliptically polarized state upon specular reflection from conducting materials, while remaining linearly polarized for non-conducting materials. Quantitatively the phase shifting of the respective orthogonal harmonic components upon specular reflection is described by (R. Siegal and J. R. Howell. *Thermal Radiation Heat Transfer*. McGraw-Hill, 1981).

$$\tan\delta_{\|} = \frac{2\cos\psi[(n^2-k^2)t-(2nk)s]}{(n^2+k^2)^2\cos^2\psi-(s^2+t^2)} \qquad (8)$$

$$\tan\delta_{\perp} = \frac{2t\cos\psi}{\cos^2\psi-(s^2+t^2)} \qquad (9)$$

where $$2s^2 = \sqrt{(n^2-k^2-\sin^2\psi)^2+4n^2k^2} + n^2-k^2-\sin^2\psi \qquad (10)$$

$$2t^2 = \sqrt{(n^2-k^2-\sin^2\psi)^2+4n^2k^2} - (n^2-k^2-\sin^2\psi) \qquad (11)$$

and where n–ik is the index of refraction of the material, $\psi$ is the specular angle of incidence, $\delta_{\|}$ is the phase shift of the E-field harmonic parallel to the plane of incidence, and, $\delta_{\perp}$ is the phase shift of the E-field harmonic perpendicular to the plane of incidence. Of importance is the relative phase shift $\delta=\delta_{\|}-\delta_{\perp}$. The complex component, k, of the index of refraction is non-zero only if the material significantly conducts electricity. It is important to note that if k=0 then t=0 in turn implying that $\delta_{\|}=\delta_{\perp}=0$ and therefore there is $\delta=0$ relative phase shift for any specular reflection from poorly conducting materials. FIG. 4 shows relative phase shifts, $\delta=\delta_{\|}-\delta_{\perp}$ for poorly conducting plastic, intermediately conducting steel (n–ik=2.5–1.4k) and highly conducting aluminum (n–ik=0.82–5.99k) illustrating significant phase shifting except at normal and grazing specular incidence for conducting materials.

The purpose of the apparatus 10 is to develop a polarization phase based algorithm for discriminating non-conducting materials from conducting materials is to detect non-zero phase shifting of incident partially linear polarized light upon specular reflection, regardless of the unknown orientation of the linear polarized component and regardless of how small the linear polarized component is relative to the total intensity of the incident light. Although the algorithm utilizes a quarter-wave plate retarder (i.e., an optical component that phase shifts light passing through it by ¼ wavelength) this is rigidly placed in series with a rotating polarizing element and the procedure for obtaining the radiance sinusoid in FIG. 3 is exactly the same as if the retarder were not there.

There is considerable advantage to replacing $\delta$ in Equation 7 with $\delta-\pi/2$. This is physically achieved by passing the light through a quarter-wave plate retarder before it is measured. Equation 7 now becomes $$\tan 2\theta_{max} = \sin\delta \cdot \tan 2\alpha \qquad (12)$$

Consider partially linear polarized light described by expression 1 incident upon a surface, with the $\hat{x}$ and $\hat{y}$ directions respectively perpendicular and parallel to the plane of incidence. According to Fresnel theory (R. Siegal and J. R. Howell. *Thermal Radiation Heat Transfer*. McGraw-Hill, 1981) upon specular reflection the harmonic parallel to the plane of incidence is attenuated by $F_{\|}$ and the harmonic perpendicular to the plane of incidence is attenuated by $F_{\perp}$ where $$F_{\perp}(n,k,\psi) = \frac{s^2+t^2-2s\cos\psi+\cos^2\psi}{s^2+t^2+2s\cos\psi+\cos^2\psi} \qquad (13)$$

$$F_{\|}(n,k,\psi) = \frac{s^2+t^2-2s\sin\psi\tan\psi+\sin^2\psi\tan^2\psi}{s^2+t^2+2s\sin\psi\tan\psi+\sin^2\psi\tan^2\psi} \qquad (14)$$

where s and t are defined in equations 10 and 11. If $\alpha=\tan^{-1}(b/a)$ is the orientation of incident partially linear polarized light, after specular reflection the orientation of the completely polarized component will be $$\tan^{-1}\left(\frac{F_\|}{F_\perp}\tan\alpha\right),$$

and the phase shift δ is determined by equations 8 thru 11. Equation 12 then becomes $$\tan 2\theta_{\max} = \sin\delta \cdot \tan\left(2\tan^{-1}\left(\frac{F_\|}{F_\perp}\tan\alpha\right)\right) \quad (15)$$

Suppose now that partially linear polarized light is incident on a poorly conducting (i.e., non-conducting) material surface. Since this means that the relative phase difference, δ, of specular reflected light is 0, equation 15 shows that regardless of what orientation, α, is the linear polarized component of the partially linear polarized light, that $$\tan 2\theta_{max}=0,$$

and therefore $\theta_{max}$=0°, 90°. The maximum of the radiance sinusoid is always observed at either 0° (for when $F_\|/F_\perp$ tanα<1) or 90° (for when $F_\|/F_\perp$ tanα>1. When $F_\|/F_\perp$ tan α=1.0 there is a singularity in equation 15 whereby there is no $\theta_{max}$. This physically results from the polarization state of light after passing through the quarterwave retarder being circularly polarized just before entering the linear polarizer analyzer. This being a single point case, it is extremely rare for the index of refraction, specular angle of incidence, and, the incident orientation of linear polarized light to conspire all at once to create such a case.

Figure 5:
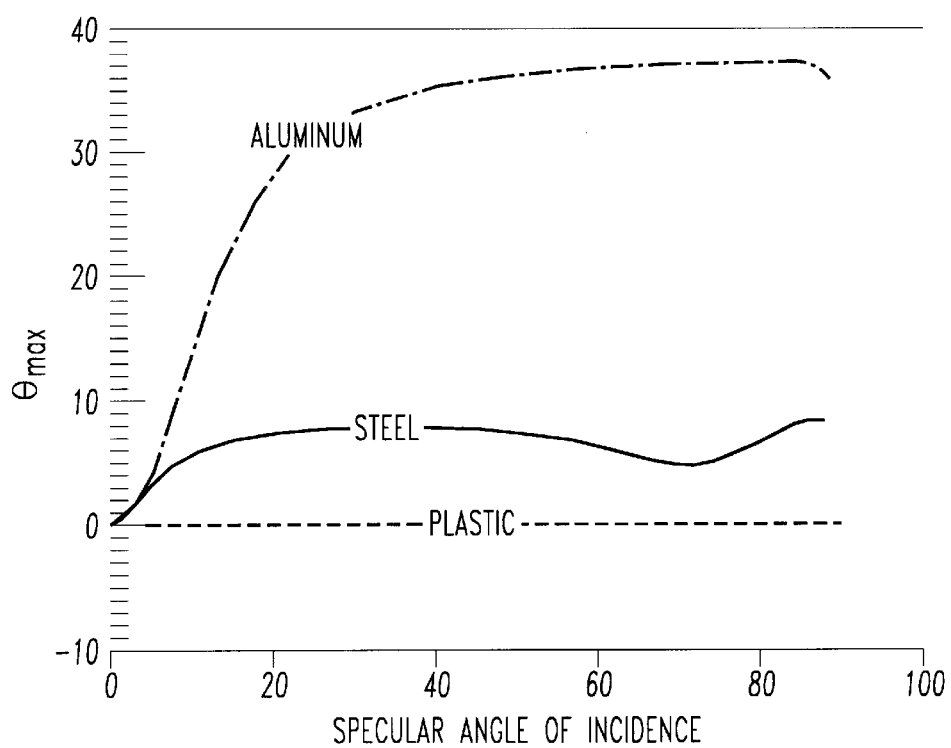
FIG. 5 is a graph observed theta$_{max}$ for various materials as a function of specular angle of incidence.

For conducting surfaces where there is non-zero k, the resulting relative phase δ=$\delta_\|$−$\delta_\perp$ will be non-zero according to equations 8 and 9, and therefore tan 2$\theta_{max}$≠0 and $\theta_{max}$ will neither be 0° nor 90°. Furthermore, the function sin δ has maximum first derivative at δ=0° which means that it will be maximally sensitive to small δ≠0. Such a property makes $\theta_{max}$ an excellent detecting function for material type classification. FIG. 5 shows the graph of $\theta_{max}$ versus specular angle of incidence, for various materials, for when incident orientation of linear polarization is initially α=45°. The measurement resolution of $\theta_{max}$ can be obtained to within ±1° which should show the extremely wide range of specular angles of incidence and initially incident angles of linear polarization over which conducting and non-conducting materials can be identified.

The physical methodology for identifying non-conducting versus conducting materials is therefore whether $\theta_{max}$=0°, 90° (for non-conductors) or $\theta_{max}$ is otherwise (for conductors). Using a quarterwave plate retarder simultaneously categorizes non-conductors and conductors in this way as well as converting cosδ to sinδ maximizing sensitivity to small nonzero δ. It is irrelevant for our algorithm if δ→δ±π/2 (i.e., reversal of the "fast" and "slow" axes of the quarterwave retarder) as it will only change the sign of $\theta_{max}$ (90°=−90°). Note that it does not matter what the relative strengths of the unpolarized and the completely polarized components are, as long as a sinusoid is discernible above the noise level of the camera sensor being used. Measuring $\theta_{max}$ only requires the sampling of transmitted radiance at three orientations θ with the linear polarizer. This is done by taking three images in series while switching electro-optically at a rapid rate as described below.

Figure 7A:
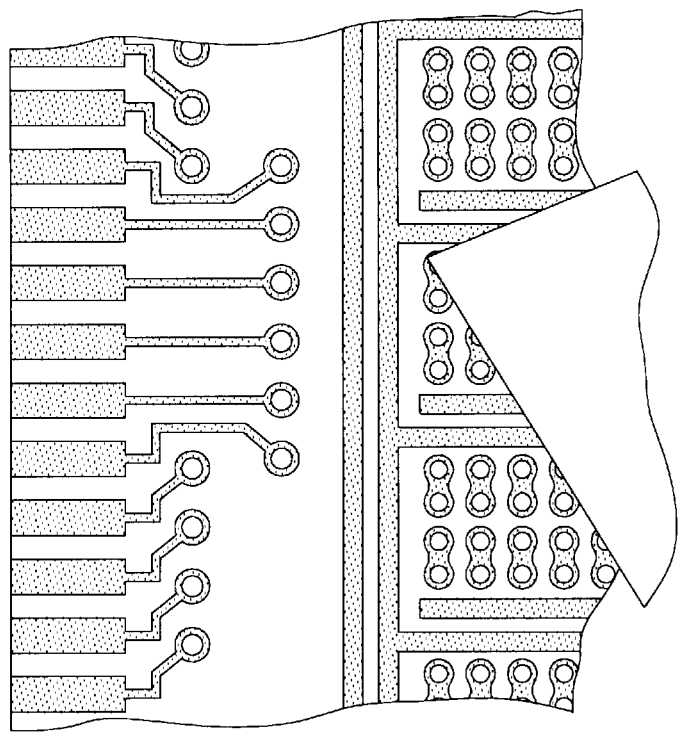
FIGS. 7a and 7b are intensity image (7a) of circuit board and diffuse paper, and segmentation image (7b), bright white representing metal, black representing dielectric.
Figure 7B:
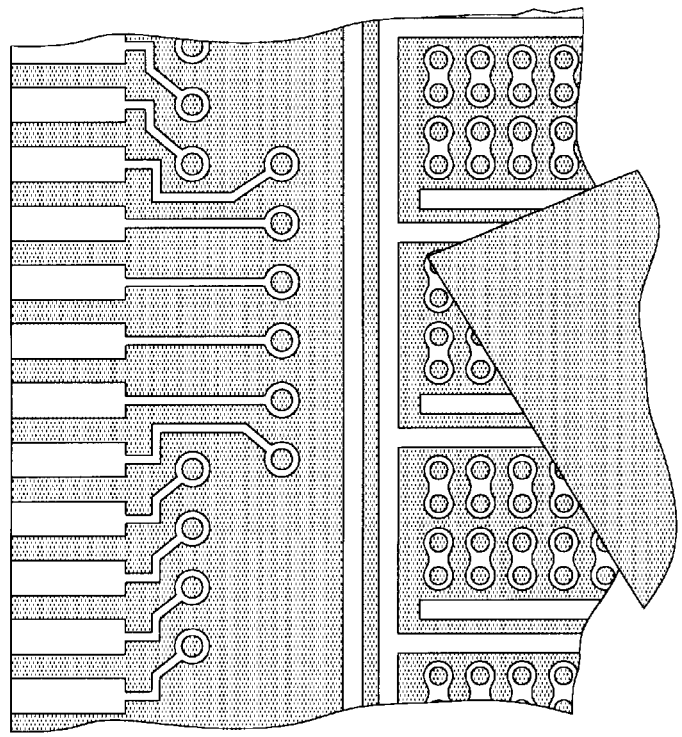

FIG. 6 shows the basic configuration of an experimental apparatus for measuring whether there is zero, or, non-zero phase shift, δ, in the polarization state of specular reflection from an object surface. Light emanating from a source passes through a linear polarizing sheet. Such polarizing sheets can be obtained at least as big as 5 feet×2 feet fitting over an extended lighting area. Specularly reflected light is shown in FIG. 6 to first pass through a ¼ wave retarder (i.e., producing δ←δ−π/2 discussed above) before passing through liquid crystal optical rotators and then through a linear polarizer analyzer before then incident on a SONY XC-77 camera. The polarization measurement configuration at the right of FIG. 6 is the same as described in (L. B. Wolff and T. A. Mancini. Liquid crystal polarization camera. In *Proceedings of the IEEE Workshop on Applications of Computer Vision*, pages 120–127, Palm Springs, Calif., December 1992) except that a ¼ wave retarder is rigidly mounted in front of the measurement apparatus. This is shown in FIG. 7 where the ¼ wave retarder is a thin square sheet pasted in front of the liquid crystals. As explained in (L. B. Wolff and T. A. Mancini. Liquid crystal polarization camera. In *Proceedings of the IEEE Workshop on Applications of Computer Vision*, pages 120–127, Palm Springs, Calif., December 1992), the polarizer analyzer does not mechanically move, and the liquid crystals electro-optically rotate the completely polarized component by a controlled fixed amount relative to the polarizer analyzer. The computation of $\theta_{max}$ is exactly the same as computation of the orientation of the linear polarized component in (L. B. Wolff and T. A. Mancini. Liquid crystal polarization camera. In *Proceedings of the IEEE Workshop on Applications of Computer Vision*, pages 120–127, Palm Springs, Calif., December 1992) whereby if the transmitted radiance is sampled at 0°, 45°, and 90° producing respectively intensity measurements $I_0$, $I_{45}$, and $I_{90}$, then $$\theta_{\max} = (1/2)\tan^{-1}\left(\frac{I_0 + I_{90} - 2I_{45}}{I_{90} - I_0}\right) + 90,$$

if $(I_{90} < I_0)$[if $(I_{45} < I_0)\theta_{\max} = \theta_{\max} + 90$ else $\theta_{\max} = \theta_{\max} - 90$], which is performed on a lookup table on a Datacube MV-200 board. This material classification method can be performed at image frame resolution at 5 Hz.

FIG. 7 (left) shows a circuit board made up of a diffuse reflecting plastic material, and solder metal. In the lower right hand corner is a piece of predominantly diffuse reflecting paper. This scene was illuminated by an extended fluorescent lighting ceiling fixture covered by a sheet of polarizing material oriented so that α is approximately 45°. The specular angle of incidence is approximately 45°. While incident light in FIG. 7 is almost purely linearly polarized, diffuse reflection from the plastic on the circuit board and diffuse reflection from the paper is mostly unpolarized with a relatively small completely polarized component. A transmitted sinusoid was discernible everywhere in this scene except the background (at the top of FIG. 7) and $\theta_{max}$ was observed to be 0° on the plastic and paper, and, between 30°–40° on the solder metal. FIG. 7 shows a segmentation with White representing $\theta_{max}$>20° and black representing $\theta_{max}$≦2° (background also represented as black).

Figure 8A:
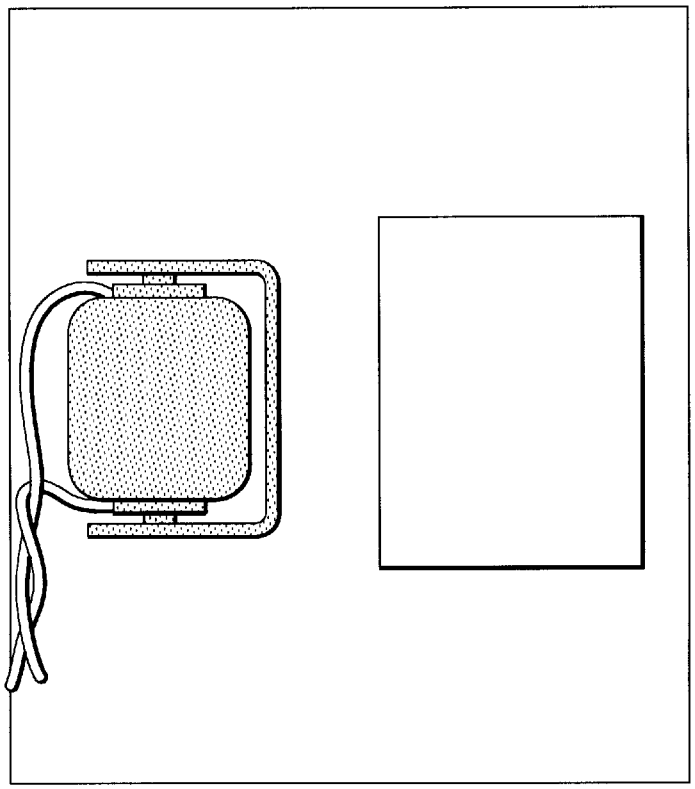
FIGS. 8a and 8b are intensity images of two different types of glass. Bright white in right image identifies conductive glass used for liquid crystals.
Figure 8B:
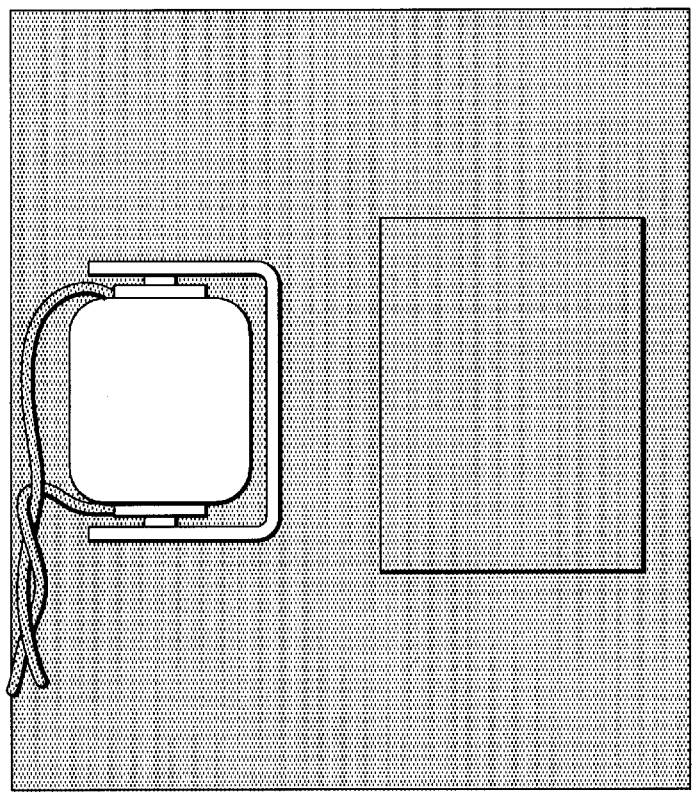
Figure 9A:
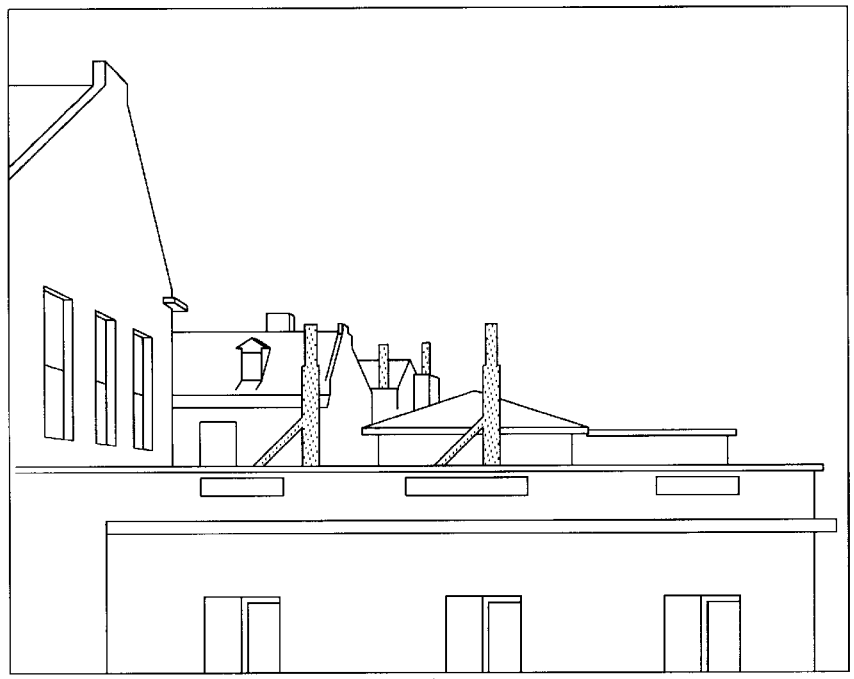
FIGS. 9a and 9b are photographs of a rooftop under illumination of partially linearly polarized skylight, and bright white in 9b identifies metal in the scene according to algorithm of the present invention.
Figure 9B:
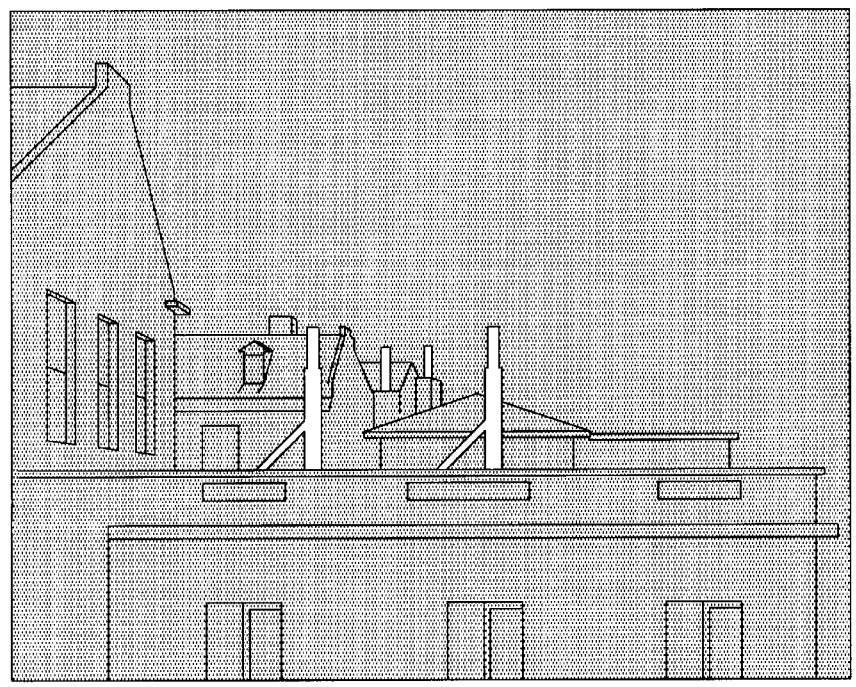

FIG. 8a shows two separate pieces of glass laying on top of a white diffuse piece of paper which is on a black anodized optical table. While both types of glass are transparent and essentially indistinguishable from their intensity visual properties, intrinsically they are very different. The piece of glass in FIG. 8b is ordinary window pane glass and is a poor conductor of electricity while the glass on the left is very conductive and is used for liquid crystals, such as shown. The scene in FIGS. 8a and 8b is illuminated by an extended fluorescent lighting ceiling fixture covered by a sheet of polarizing material oriented so that α is approximately 45°. The specular angle of incidence is approximately 30°. The "mirror" specular reflection of the fluorescent lighting tubes can be seen in the glass with the reflection of the reflectors in the ceiling fixtures less prominent. Diffuse reflection from the white paper through the glass is comparable and in some portions even larger than the specular reflection component. This is another scene in which the method proposed in (L. B. Wolff. Polarization-based material classification from specular reflection. *IEEE Transactions on Pattern Analysis and Machine Intelligence (PAMI)*, 12(11):1059–1071, November 1990) fails. The bright White color label in the right image of FIG. 8 represents $\theta_{max}$>20° while the rest of the elements in this scene have $\theta_{max}$<2°.

FIG. 10a shows a scene outdoors of building rooftops. Illumination is from cloudless skylight taken early in the morning with the sun low in the sky. Rayleigh's law of scattering shows that skylight is partially linear polarized with content of linear polarization increasing as the angle between a patch of skylight and the sun becomes greater. More precisely, if the angle between a patch of skylight is ω, the percent of linear polarization contained in skylight by intensity magnitude is given by (S. Chandrasekhar. *Radiative Transfer.* Dover Publications, N.Y., 1960)

$$\frac{\sin^2\omega}{1+\cos^2\omega}.$$

Most of the skylight incident on the objects in FIG. 10a has at least 30 percent of linear polarization content. The orientation of the component of linear polarization is tangent to the circle centered at the position of the sun and passing through the patch of sky. The incident angle α of linear polarization relative to the plane of incidence varies throughout the scene. The pixels labeled bright white in FIG. 10b have a discernible sinusoid with either 88°>$\theta_{max}$>2° or 178°>$\theta_{max}$>92° revealing the outlet vents on the rooftops composed of metal. There are parts of these metallic objects that are not segmented due to α and/or specular angle of incidence ψ being too close to 0° or 90°. What has been found is that while not all metal is necessarily identified in an outdoor scene due to geometric conditions and some incident light possibly being unpolarized, pixels that are classified to retard the linear polarized component of partially linear polarized light are indeed metal with very few false identifications. This robustness makes this methodology quite useful for detection of metal in aerial or ground based automatic target detection and/or recognition. See also U.S. patent application Ser. No. 07/968,175, incorporated by reference herein.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A method for determining electrical conductivity of a surface of an object comprising the steps of:

polarizing light;

reflecting the polarized light off the surface of the object;

receiving the reflected polarized light at a camera mechanism out of contact with the surface of the object;

converting the received polarized light into a corresponding electrical signal with the camera mechanism;

determining phase retardance of polarization due to the reflection of the polarized light off of the surface of the object; and identifying the electrical conductivity of the surface of the object from the phase retardance of the polarization of the polarized light reflected off of the surface of the object.

2. An apparatus for determining electrical conductivity of a surface of an object comprising:

a first polarizer for polarizing light incident upon the surface of the object; and a camera mechanism for receiving the polarized light reflected from the surface of the object and identifying the electrical conductivity of the surface of the object from phase retardance of polarization of the polarized light upon reflection from the surface of the object, said camera mechanism out of contact with the surface of the object.

3. An apparatus as described in claim 2 wherein the camera mechanism includes a CCD camera which receives the polarized light reflected from the surface of the object and identifies the electrical conductivity of the surface of the object from phase retardance of polarization of the polarized light upon reflection from the surface of the object.

4. An apparatus as described in claim 3 wherein the camera mechanism includes a second polarizer disposed adjacent the CCD camera through which the polarized light reflected from the surface of the object passes before it is received by the CCD camera.

5. An apparatus as described in claim 4 wherein the light has a polarized component; and wherein the camera mechanism includes means for rotating the polarized component of the light.

6. An apparatus as described in claim 5 wherein the camera mechanism includes a retarder disposed adjacent the at least one electro-optic crystal through which the polarized light reflected from the surface of the object passes before it passes through the at least one electro-optic crystal.

7. An apparatus as described in claim 6 wherein the retarder is a ¼ wave retarder.

8. An apparatus as described in claim 2 wherein the surface of the object is a conductive surface.

9. An apparatus as described in claim 8 wherein the conductive surface is a material selected from the group consisting of steel, aluminum, solder and liquid crystal glass.

10. An apparatus as described in claim 2 wherein the surface of the object is a nonconductive surface.

11. An apparatus as described in claim 10 wherein the nonconductive surface is a material selected from the group consisting of plastic, paper and nonconductive glass.

12. An apparatus as described in claim 5 wherein said means for rotating the polarized component of the light is at least one electro-optic crystal disposed adjacent to the second polarizer through which the polarized light reflected from the surface of the object passes before it passes through the second polarizer.

13. A method as described in claim 1 further comprising the step of:

receiving the reflected polarized light at a CCD camera.

14. A method as described in claim 13 further comprising the steps of:

employing a second polarizer adjacent the CCD camera; and passing the reflected polarized light through the second polarizer before it is received by the CCD camera.

15. A method as described in claim 14 further comprising the steps of:

employing a polarized component in the light; and rotating the polarized component of the light.

16. A method as described in claim 14 further comprising the steps of:

employing at least one electro-optic crystal adjacent to the second polarizer; and passing the reflected polarized light through the at least one electro-optic crystal before it passes through the second polarizer.

17. A method as described in claim 16 further comprising the steps of:

employing a retarder adjacent the at least one electro-optic crystal; and passing the reflected polarized light through the retarder before it passes through the at least one electro-optic crystal.

18. A method as described in claim 17 further comprising the step of:

employing as the retarder a ¼ wave retarder.

19. A method as described in claim 1 further comprising the step of:

employing as the surface of the object a conductive surface.

20. A method as described in claim 19 further comprising the step of:

employing a material selected from the group consisting of steel, aluminum, solder and liquid crystal as the conductive surface.

21. A method as described in claim 1 further comprising the step of:

employing as the surface of the object a nonconductive surface.

22. A method as described in claim 21 further comprising the step of:

employing a material selected from the group consisting of plastic, paper and nonconductive glass as the nonconductive surface.

23. A method as described in claim 1 further comprising the step of:

employing an unpowered surface as the surface of said object.

24. A method as described in claim 1 further comprising the step of:

employing substantially non-retarded linearly polarized light as said polarized light.

25. An apparatus as described in claim 2 wherein the surface of said object is unpowered.

26. An apparatus as described in claim 2 wherein the polarized light which is polarized by said first polarizer is substantially non-retarded linearly polarized light.

* * * * *